Patented Apr. 18, 1944

2,346,650

UNITED STATES PATENT OFFICE 2,346,650

ALLAYING AND BINDING COAL PARTICLES OR DUST AND THE LIKE

Leopold F. Bornstein, Wilmington, Del.

No Drawing. Application August 23, 1941,
Serial No. 408,120

1 Claim. (Cl. 44—6)

In connection with the storage of coal and the like, there is always the problem of dust or granule formation through oxidation of the coal, and/or as a consequence of handling and shifting, with the attendant hazard of spontaneous combustion from these causes. It is therefore not only desirable but highly advantageous from an economical standpoint to preclude access of air and water to the coal and to thus prevent its oxidation and disintegration. For the above purposes and also for the purpose of manufacturing briquettes, various methods have been proposed and different kinds of binding materials used for allaying comminuted coal. These methods involve treatment of the coal with different oils of mineral origin, or with asphalts of various sorts, either straight or in solutions of naphtha or the like. Such oils and asphalts have also been extensively used in aqueous emulsions, sometimes with other ingredients like natural or synthetic resins, starch, dextrine, glycerine, etc., but films formed by such methods I have found to be lacking in mechanical strength and incapable of effectively binding the coal particles, especially under bad weather conditions attended by high winds, and moreover to be wanting in resistivity to deterioration and disintegration through evaporation in hot weather, and under the action of heavy rains.

The main object of my invention is to overcome the various drawbacks mentioned above. In other words, I aim to make possible the formation of an allaying and binding preservative film on coal, coal dust and the like, which is capable of withstanding all extremes of weather conditions and therefore of preventing access of air and water to the coal and/or coal dust in storage with the result that oxidation and subsequent disintegration and/or erosion is effectively precluded and the danger of spontaneous combustion in turn minimized.

The foregoing objective I attain as hereinafter more fully disclosed by the preparation of a water soluble cold-setting urea resin similar in character and chemical composition to those ordinarily used in the manufacture of plywood, and applying the same to the coal. These resins can be used either as a liquid consisting of the urea resin in solution and suspension together with water and uncondensed formaldehyde without removal of the liquids from the resin; or as a resin in a further advanced stage of condensation after the water and formaldehyde are removed, i. e., in solid form or as a powder. This solid or powder resin can then be dissolved in water and used like the solution described above, the relation between the solid resin and the water depending upon the solid content desired in the film. In carrying out my invention, I preferably use a resin that is water soluble for the stage of application and which has been condensed in such a manner as to become fast setting and water resistant after application whereby an impervious preservative film is formed when spread on coal or coal dust and the like. The setting can be fastened by employing suitable accelerators which I dissolve in the resin solution before using it. The resin is characterized by a short jelling or congealing time. The application of the composition I effect by spraying the same directly upon coal or coal dust in storage to form the impervious protective film, or, in the process of forming briquettes, by mixing the composition with coal dust.

Below is a formula for an oxidation preventive coating and binding composition for comminuted coal or the like prepared in accordance with my invention, which has given very excellent results in practice. It is to be understood that within the scope of the concluding claim urea resin compositions made under other formulas, or water soluble urea formaldehyde resins available on the market, may be employed in my method providing that they have similar properties.

The formula above referred to conveniently embraces 450 parts by weight of formaldehyde (about 37%) and containing 0.02% formic acid is condensed with 180 parts by weight of urea previously dissolved in 90 parts by weight of water, in the presence of 0.5 part by weight of tri-sodium phosphate ($Na_3PO_4.12H_2O$). The condensation is preferably carried out by mixing the formaldehyde at approximately 60° C. with a urea solution heated to substantially the same temperature. Immediately after mixing, the tri-sodium phosphate is added and the mixture is then allowed to react at 98° C. (while boiling very slowly) until the originally water-clear liquid begins to cloud. The time required for condensation may depend on the surface or shape of the kettle, and other conditions. Usually clouding occurs when the solid content or the resin (determined by hardening of the resin at 120° C. for four hours) reaches 35% to 45%. In this respect the resins which I employ differ from those used in plywood manufacture which latter are further condensed until the solid content reaches from 60% to 70%. If the content of formic acid in the formaldehyde (which acid is an impurity) changes, the amount of tri-sodium phosphate must in turn be proportionately changed. This resin is condensed under normal or atmospheric pressure, but if desired condensation can be accelerated under vacuum in the manner usually practiced in the manufacture of synthetic resins generally. In the latter case the condensation can of course be carried on to a higher solid content, or resin of too high a solid content can be diluted with water.

A very satisfactory catalyst for use in the resin solution for the purpose of accelerating setting for the purposes of my invention is a 15% to 25% solution of ammonium sulphate or ammonium chloride in water, in which an 8% to 15% solution of ammonia is dissolved; but any other accelerators now available on the market for this type of resin can be used.

In accordance with my invention, various other substances can be added to the above type of resin, such, for example, as aqueous emulsions of different oils, asphalts, and synthetic or natural resins. A product well suited for the purpose is obtained by adding an aqueous emulsion of asphalt in which oleic acid and ammonia are used as emulsifying agents. However, any other emulsions of similar characteristics containing asphalts, oils, synthetic or natural resins or gums can be used for blending with the urea resin. When blended with the resin, such emulsions act as plasticisers, and also improve the appearance of the coal or other material to which it may be applied. It is also possible to add to the urea resins described above water soluble plasticisers of the usual kinds, e. g., glycerine, in order to increase the elasticity of the resin film on the coal. The resin can moreover be dyed black with appropriate dyes. It is further possible to add to the urea resin a water soluble phenolic resin of the type used in plywood bonding, but this has the disadvantage of retarding setting and may be undesirable by virtue of having a phenolic odor.

The most economical method of applying urea formaldehyde resin solutions, and the one giving the best penetration, is by spraying it upon the bulk coal or coal dust, although, if found more convenient, the solution may be applied in other ways. In the formation of briquettes the solution may be mixed with the coal dust, and the mixture pressed into briquettes in a suitable molding machine.

While I have more particularly described my invention in connection with the treatment of coal, it is to be understood that other materials in granular or comminuted form may be similarly treated with attainment of the advantages equal in all respects to those which have been pointed out.

Having thus described my invention, I claim:

The method of treating coal in bulk with a solution of urea-formaldehyde resin of the water-soluble cold-setting type which consists of 35–45% urea-formaldehyde resin solids with 65–55% water, and suitably coating the solution over the coal in bulk, with resultant formation of an adherent weather and water resistant protective covering thereover.

LEOPOLD F. BORNSTEIN.